United States Patent [19]

Yoshida et al.

[11] Patent Number: 5,610,230

[45] Date of Patent: Mar. 11, 1997

[54] LIQUID SILICONE RUBBER COMPOSITIONS

[75] Inventors: Takeo Yoshida; Manabu Narumi, both of Usui-gun, Japan

[73] Assignee: Shin-Etsu Chemical Co., Ltd., Tokyo, Japan

[21] Appl. No.: 561,938

[22] Filed: Nov. 22, 1995

[30] Foreign Application Priority Data

Nov. 24, 1994 [JP] Japan .................. 6-314174

[51] Int. Cl.$^6$ .............................. C08K 5/54
[52] U.S. Cl. .................. 524/730; 523/212; 528/15; 528/18; 528/21; 528/23; 524/789
[58] Field of Search ............... 523/212; 524/730, 524/789; 528/15, 18, 21, 23

[56] References Cited

U.S. PATENT DOCUMENTS 5,438,094 8/1995 Fujiki et al. ................... 528/15

Primary Examiner—Melvyn I. Marquis
Attorney, Agent, or Firm—Millen, White, Zelane, & Branigan, P.C.

[57] ABSTRACT

A liquid silicone rubber composition contains (A) an organopolysiloxane having at least two alkenyl groups, (B) a reinforcing silica filler, (C) a condensation catalyst, (D) a silanol group-containing siloxane wetter, (E) an organohydrogenpolysiloxane having at least two hydrogen atoms, and (F) a platinum catalyst. Components (C) and (D) assist in blending a large amount of the silica filler in the composition. The composition is smoothly flowing, quickly curable and suitable for injection molding.

12 Claims, No Drawings

LIQUID SILICONE RUBBER COMPOSITIONS

BACKGROUND OF THE INVENTION

1. Field of the Invention

This invention relates to a liquid silicone rubber composition having improved flow, curing characteristics, and viscosity stability during shelf storage, and suitable for injection molding and a method for preparing the same.

2. Prior Art

Silicone polymers loaded with large amounts of reinforcing silica fillers are known to be improved in physical properties including tensile strength, tear strength, elongation, and heat resistance. In order to load silicone polymers with large amounts of silica, noticeable amounts of wetters must be added to improve the dispersibility of silica.

In the prior art, $\alpha,\omega$-siloxane diols of the formula: $HO[(CH_3)_2SiO]_yH$ wherein y is 10 to 20, that is, having a degree of polymerization of 10 to 20 are widely used as the wetter. Other useful wetters are $\alpha$-alkoxy-$\omega$-siloxanols of the formula: $R'O[(CH_3)_2SiO]_xH$ wherein R' is a short chain alkyl group and x is 3 to 5 as disclosed in U.S. Pat. No. 3,799,962. Further a mixture of hexamethyltrisiloxane diol and methoxyhexamethyltrisiloxanol is proposed as an anti-structure agent as disclosed in U.S. Pat. No. 3,925,285. Although the use of such hydroxyl-terminated silicone fluids as the wetter enables to blend large amounts of silica filler in silicone polymers, the resulting silicone polymer compositions are thixotropic, high viscosity compositions and thus unsuitable for injection molding because of the lack of flow.

Besides the above-mentioned silicone fluids, hexamethyldisilazane is also known as a wetter for liquid silicone rubber compositions. Although liquid silicone rubber compositions obtained using hexamethyldisilazane as the wetter are well flowing and less viscous, amines can be produced as by-products during blending of hexamethyldisilazane and they adversely affect curing behavior and cause thickening during shelf storage.

SUMMARY OF THE INVENTION

Therefore, an object of the present invention is to provide a liquid silicone rubber composition having improved flow, curing behavior, and viscosity stability during shelf storage. Another object of the present invention is to provide a method for preparing the same.

The present invention generally pertains to a liquid silicone rubber composition of the addition curing type comprising (A) an organopolysiloxane having at least two alkenyl groups each attached to a silicon atom in a molecule, (B) a reinforcing silica filler having a specific surface area of at least 50 m²/g as measured by BET, (E) an organohydrogenpolysiloxane having at least two hydrogen atoms each attached to a silicon atom in a molecule, and (F) a platinum catalyst. We have found that the composition can be improved in flow, cure, and viscosity stability during shelf storage by blending therein (D) a silanol group-containing siloxane of the general formula (1) or (2) shown below and (C) a condensation catalyst for promoting condensation between silanol groups of the siloxane and silanol groups available on the silica filler surface, especially by adding and blending condensation catalyst (C) and siloxane (D) during the step of mixing whole or a part of component (A) and whole of component (B) therewith, and then blending the remaining components therewith.

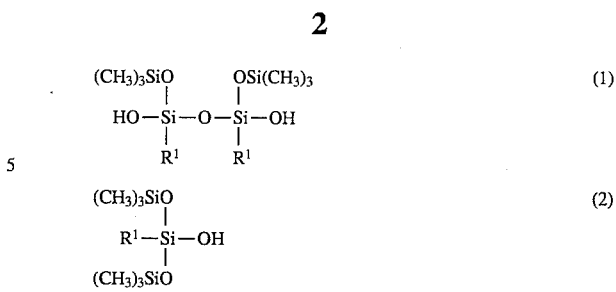

In the formulae, $R^1$ is a methyl, trimethylsiloxy, vinyl or trifluoropropyl radical.

As previously mentioned, the use of prior art well-known hydroxyl-terminated silicone fluids as the wetter has the problem that the resulting compositions become thixotropic and thickened and are unsuitable for injection molding due to the lack of flow. The use of hexamethyldisilazane instead as the wetter has the problem that the resulting compositions, which are well flowing, are less curable and lack shelf stability of viscosity. These problems are overcome by blending organopolysiloxane (A) and silica filler (B) with silanol group-containing siloxane (D) of formula (1) or (2) and condensation catalyst (C), thereby inducing condensation between silanol groups of the siloxane and silanol groups on the silica filler surface according to the present invention. Blending of components (C) and (D) significantly improves the curing behavior and suppresses any viscosity increase during shelf storage of a liquid silicone rubber composition without detracting from the smooth flow thereof. Since the siloxane compounds of formulae (1) and (2) have highly active silanol groups, they significantly facilitate blending of the silica filler.

Accordingly, in one aspect, the present invention provides a liquid silicone rubber composition comprising (A) an organopolysiloxane having at least two alkenyl groups each attached to a silicon atom in a molecule, (B) a reinforcing silica filler having a specific surface area of at least 50 m²/g as measured by BET, (C) a condensation catalyst, (D) a compound of formula (1) or (2), (E) an organohydrogenpolysiloxane having at least two hydrogen atoms each attached to a silicon atom in a molecule, and (F) a platinum catalyst.

In a second aspect, the present invention provides a method for preparing the liquid silicone rubber composition defined above, comprising the step of blending components (C) and (D) in the step of mixing whole or a part of component (A) and whole of component (B) therewith.

DETAILED DESCRIPTION OF THE INVENTION

Component (A) of the liquid silicone rubber composition according to the invention, which is a main component, is an organopolysiloxane having at least two alkenyl groups each attached to a silicon atom in a molecule. Preferably, the organopolysiloxane is of the following average compositional formula (3):

$$R_aSiO_{(4-a)/2} \qquad (3)$$

wherein R is a substituted or unsubstituted monovalent hydrocarbon group, 0.001 to 5 mol % of the R groups being alkenyl groups, and letter a is a positive number of 1.65 to 2.35.

In formula (3), R is a substituted or unsubstituted monovalent hydrocarbon group attached to a silicon atom, preferably having 1 to 12 carbon atoms, more preferably 1 to 8 carbon atoms. Examples of the hydrocarbon group include alkyl groups such as methyl, ethyl, propyl, isopropyl, butyl, pentyl, neopentyl, hexyl, heptyl, octyl, nonyl, decyl and dodecyl; cycloalkyl groups such as cyclopentyl, cyclohexyl and cycloheptyl; alkenyl groups such as vinyl, allyl, propenyl, isopropenyl, butenyl, isobutenyl, hexenyl and cyclohexenyl; aryl groups such as phenyl, tolyl, xylyl, naphthyl and biphenyl; aralkyl groups such as benzyl, phenylethyl, phenylpropyl and methylbenzyl; and substituted hydrocarbon groups wherein some or all of the hydrogen atoms are replaced by halogen atoms (e.g., F, Cl and Br) or cyano groups, for example, chloromethyl, 2-bromoethyl, 3,3,3-trifluoropropyl, 3-chloropropyl and cyanoethyl.

At least two of the organic groups represented by R are alkenyl groups. Preferably 0.001 to 5 mol %, more preferably 0.01 to 2 mol % of the entire R groups are alkenyl groups. If the content of alkenyl group is less than 0.001 mol % of the R groups, the resulting composition would be less curable. If the content of alkenyl group is more than 5 mol % of the R groups, the composition would result in a cured product having poor physical properties such as tensile strength, tear strength and elongation. It is noted that alkenyl groups may be attached to silicon atoms at the ends of or midway in the molecular chain or both.

Letter a is a positive number of 1.65 to 2.35, preferably 1.8 to 2.2.

With respect to its molecular structure, the organopolysiloxane is preferably of a straight chain, especially having alkenyl groups at both ends of its molecular chain, while it may partially have a branched structure. Also preferably the organopolysiloxane is blocked at the end of its molecular chain with a triorganosilyl group such as trivinylsilyl, methyldivinylsilyl, dimethylvinylsilyl and trimethylsilyl.

Although the organopolysiloxane may have any desired molecular weight, it should preferably have a viscosity of 100 to 300,000 centipoise at 25° C., more preferably 1,000 to 100,000 centipoise at 25° C. when the requirements that it afford a liquid silicone rubber composition and cure into a rubbery elastomer are taken into account.

Component (B) of the silicone rubber composition is a reinforcing silica filler having a specific surface area of at least 50 m²/g as measured by a BET method. Examples include fumed silica, fired silica and precipitated silica, which may be used alone or in admixture of two or more. The silica fillers may have been treated at the surface with suitable agents such as linear organopolysiloxanes, cyclic organopolysiloxanes and organosilazanes, typically hexamethyldisilazane.

For imparting transparency and reinforcement to a silicone rubber composition, fumed silica having a specific surface area of 100 to 400 m²/g is preferred. Reinforcing precipitated silica having a specific surface area of 50 to 800 m²/g is preferred when the cost and physical properties (elasticity) of the resulting silicone rubber composition are important.

Preferably about 5 to 100 parts by weight, more preferably about 10 to 60 parts by weight of silica filler (B) is blended with 100 parts by weight of organopolysiloxane (A). Outside the range, silicone rubber compositions would be less moldable and cured products therefrom would be low in mechanical strength such as tensile strength and tear strength.

According to the present invention, while organopolysiloxane (A) is blended with silica filler (B), condensation catalyst (C) and silanol group-containing siloxane or wetter (D) are blended together. Condensation catalyst (C) is effective for significantly improving the flow of the silicone rubber composition. Without component (C), the silicone rubber composition is poorly flowable and cannot be injection molded. Any desired condensation catalyst may be used as long as it can promote condensation between silanol groups of siloxane (D) and silanol groups available on the surface of silica filler (B). Examples of the condensation catalyst include ammonia, aqueous ammonia, ammonium salts such as tetrabutyl ammonium hydroxide, phosphorus-siliconate salts as shown by the formula:

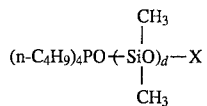

wherein X is a hydrogen atom or $(C_4H_9)_4P$— group and d is an integer of 3 to 100, basic compounds such as potassium-siliconate salts as shown by the formula:

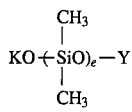

wherein Y is K or hydrogen atom and e is an integer of 3 to 100, tin compounds such as tin octylate and dibutyltin dilaurate, titanium compounds such as tetrabutyl titanate, and zinc compounds such as zinc octylate and zinc naphthenate, with ammonia and aqueous ammonia being preferred.

Preferably condensation catalyst (C) is blended in an amount of 0.005 to 1 part by weight, more preferably 0.01 to 0.8 part by weight per 1 part by weight of component (D). Outside this range, smaller amounts of condensation catalyst (C) would result in less flowing compositions whereas larger amounts of condensation catalyst (C) would adversely affect the cure of compositions and the mechanical properties of cured products.

Component (D) is a silanol group-containing organosiloxane compound of the formula (1) or (2) which serves as a wetter. At the same time as components (A) and (B) are blended, wetter (D) is blended therein together with condensation catalyst (C) for thereby significantly improving the cure, flow and viscosity stability during storage of the silicone rubber composition according to the invention.

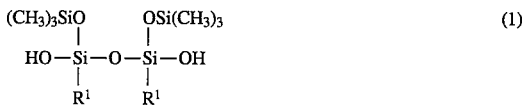

$R^1$ is a methyl, trimethylsiloxy, vinyl or trifluoropropyl radical.

The compounds of formula (1) can be obtained by a well-known technique, for example, by hydrolyzing 1,1,1, 3,5,7,7,7-octamethyltetrasiloxane, 1,1,1,7,7,7-hexamethyl-3,5-divinyltetrasiloxane, 3,5-bis-(trifluoropropyl)-1,1,1,7,7, 7-hexamethyltetrasiloxane 1,1,1,3,7,7,7-heptamethyl-5-vinyltetrasiloxane and 3,5-bis(trimethylsiloxy)-1,1,1,7,7,7-hexamethyltetrasiloxane in the presence of a Pd/C catalyst. The compounds of formula (2) can also be obtained by a well-known technique, for example, by hydrolyzing 1,1,1, 3,5,5,5-heptamethyltrisiloxane, 3-(trimethylsiloxy)-1,1,1,5, 5,5-hexamethyltrisiloxane, 1,1,1,5,5,5-hexamethyl-3-vinyltrisiloxane and 1,1,1,5,5,5-hexamethyl-3-trifluoropropyltrisiloxane in the presence of a Pd/C catalyst.

The wetting compounds of formulae (1) and (2) may be used alone or in admixture of two or more. The compound of formula (1) or (2) is preferably blended in an amount of 1 to 30% by weight, more preferably 2 to 20% by weight based on the weight of silica filler (B). Less than 1% by weight based on the silica filler of the wetting compound would be insufficient to improve viscosity stability during storage because the majority of silica remains strongly active. More than 30% by weight based on the silica filler of the wetting compound would adversely affect the mechanical properties of cured products and add to the cost.

Component (E) is an organohydrogenpolysiloxane which serves as a crosslinking agent for the silicone rubber composition of the invention. More particularly, addition reaction occurs between hydrogen atoms attached to silicon atoms (that is, SiH groups) in organohydrogenpolysiloxane (E) and alkenyl groups attached to silicon atoms in organopolysiloxane (A) in the presence of a platinum catalyst (F) to be described below to cause crosslinking, thereby curing the silicone rubber composition. Therefore, organohydrogenpolysiloxane (E) should have at least two hydrogen atoms, preferably 2 to 200 hydrogen atoms, more preferably 3 to 50 hydrogen atoms each attached to a silicon atom (that is, at least two SiH groups) in a molecule.

Preferred organohydrogenpolysiloxane used herein is of the following compositional formula (4).

$$R'_b H_c SiO_{(4-b-c)/2} \qquad (4)$$

R' is selected from substituted or unsubstituted monovalent hydrocarbon groups having 1 to 12 carbon atoms, especially 1 to 8 carbon atoms, which are as defined for R, preferably aliphatic unsaturated bond-free groups, more preferably alkyl, aryl, aralkyl and substituted alkyl groups. Letters b and c are $0.8 \leq b \leq 2.2$, preferably $1.2 \leq b \leq 2$ and $0.002 \leq c \leq 1.0$, preferably $0.01 \leq c \leq 0.8$, and $0.8 < b+c \leq 3$, preferably $1.5 \leq b+c \leq 2.7$.

With respect to its molecular structure, organohydrogenpolysiloxane (E) may be linear, cyclic, branched or a three-dimensional network. It may have SiH groups at the ends of or midway in its molecular chain. Although the molecular weight is not critical, the organohydrogenpolysiloxane should preferably have a viscosity of 1 to 1,000 centipoise, more preferably 3 to 500 centipoise at 25° C.

Organohydrogenpolysiloxane (E) is preferably used in such an amount that the ratio of the number of silicon atom-attached hydrogen atoms (SiH groups) in component (E) to the number of silicon atom-attached alkenyl groups in component (A) may range from 0.5:1 to 20:1, more preferably from 1:1 to 3:1. If the ratio of SiH groups to alkenyl groups is below the range, the composition would not fully cure. If the ratio of SiH groups to alkenyl groups is above the range, bubbling could occur.

The platinum catalyst used as component (F) is effective for curing the composition of the invention. Exemplary platinum catalysts include the finely divided metallic platinum catalyst described in U.S. Pat. No. 2,970,150, the chloroplatinic acid catalyst described in U.S. Pat. No. 2,823,218, the platinum-hydrocarbon complex compounds described in U.S. Pat. Nos. 3,159,601 and 3,159,662, the chloroplatinic acid-olefin complex compound described in U.S. Pat. No. 3,516,946, and the platinum-vinyl siloxane complex described in U.S. Pat. Nos. 3,775,452 and 3,814,780. Other platinum group catalysts including palladium and rhodium catalysts may also be useful. The platinum catalyst is preferably used in such an amount that there is 0.1 to 1,000 parts, especially 1 to 100 parts by weight of metallic platinum per million parts by weight of the total of organopolysiloxane (A) and organohydrogenpolysiloxane (E). Less than 0.1 ppm of platinum would be too small for the composition to cure whereas more than 1,000 ppm of platinum is expensive.

The silicone rubber composition of the invention is a liquid composition having fluidity. It preferably has a viscosity of 50 to 50,000 poise, more preferably 200 to 20,000 poise at 25° C. although the viscosity is not critical. If desired, the silicone rubber composition of the invention may have blended therein various additives commonly used in this type of composition, for example, reaction control agents, pigments, flame-retardants, and mold release agents insofar as the benefits of the invention are not lost.

Broadly stated, the silicone rubber composition of the invention can be obtained simply by mixing components (A) to (F) and optional components in an appropriate manner. Better results are obtained by blending whole or a part, for example at least 50% by weight, preferably at least 70% by weight of, organopolysiloxane (A) and whole of silica filler (B) and at the same time, blending whole of condensation catalyst (C) and whole of silanol group-containing organosiloxane (D) therein. The condensation catalyst (C) thus blended can promote condensation between silanol groups of siloxane (D) and silanol groups available on silica filler (B), allowing a large amount of silica filler to be blended without detracting from the flow of the composition. Since the condensation between silanol groups of siloxane (D) and silanol groups of silica filler (B) suppresses the activity of silica filler (B), the composition is improved in shelf stability of viscosity.

Components (E) and (F) may preferably be blended to the mixture obtained by mixing components (C) and (D) to whole or a part of component (A) and whole of component (B). When a part of component (A) is mixed with components (B), (C) and (D), the remaining component (A) may preferably be blended to the mixture of components (B), (C) and (D) and the part of component (A).

The amount of component (A) to be mixed with components (B), (C) and (D) is preferably at least 50% by weight, more preferably at least 70% by weight of the total amount of component (A).

The other optional components may be blended upon the addition of components (C) and (D) to whole or a part of component (A) and whole of component (B) or the addition of components (E) and (F) to the above mixture.

As a general rule, the silicone rubber composition of the invention can be obtained simply by uniformly mixing components (A) to (F) and optional components at room temperature. Preferably, the composition is prepared by kneading components (A) to (D) in the manner described above in a suitable kneader such as a planetary mixer, pressure kneader mixer and extruder, heat treating the blend at 100° to 400° C. for 1 minute to 8 hours, and finally mixing the blend with components (E) and (F).

Like conventional silicone rubber compositions, the thus obtained silicone rubber composition of the invention can be molded by any suitable means. Depending on its viscosity, a choice may be made among injection molding, transfer molding, casting and compression molding. Better results are obtained when the composition of the invention is molded by an injection molding machine. After molding, the composition is generally cured by heating at room temperature to 250° C. for 10 seconds to 120 minutes. If desired, the cured parts are subject to secondary vulcanization for about ½ to 4 hours.

Since the liquid silicone rubber composition, especially the one obtained by blending condensation catalyst (C) and silanol group-containing organosiloxane (D) during the step of blending organopolysiloxane (A) and silica filler (B) is smoothly flowing and readily curable, and keeps its viscosity relatively stable during shelf storage, it is very suitable as an injection molding material. The composition may be molded into parts which will find use as roll members, automotive connectors, gaskets for microwave ovens, keyboard parts, clock parts, camera parts, and O-rings.

EXAMPLE

Examples of the present invention are given below by way of illustration and not by way of limitation. All parts are by weight.

Example 1

A liquid silicone rubber base was prepared by uniformly mixing 100 parts of a dimethylpolysiloxane blocked with a dimethylvinylsiloxy group at either end having a viscosity of 10,000 centipoise at 25° C. 40 parts of precipitated silica having a BET specific surface area of 200 m²/g (Nipsil LP, manufactured by Nihon Silica Industry K.K.), 3 parts of a siloxane of formula (5) shown below, and 2 parts of 29% aqueous ammonia in a kneader mixer and further mixing at 150° C. for one hour.

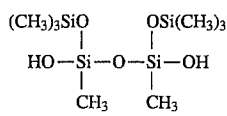

(5)

A liquid silicone rubber composition was prepared by adding to 100 parts of the liquid silicone rubber base 30 parts of the same dimethylpolysiloxane as above, 2 parts of methylhydrogenpolysiloxane of formula (6) shown below having a viscosity of 15 centistokes at 25° C. as a crosslinking agent, 0.1 part of an isopropyl alcohol solution of 1% chloroplatinic acid, and 0.05 part of ethynyl cyclohexanol as a reaction control agent and mixing them uniformly.

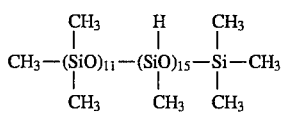

(6)

Example 2

A liquid silicone rubber composition was prepared as in Example 1 except that 3 parts of a siloxane of formula (7) shown below was used instead of the siloxane of formula (5).

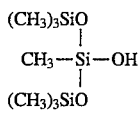

(7)

Comparative Example 1

A liquid silicone rubber composition was prepared as in Example 1 except that 3 parts of hexamethyldisilazane was used instead of the siloxane of formula (5) and 1 part of water was used instead of 2 parts of 29% aqueous ammonia.

Comparative Examples 2 and 3

Liquid silicone rubber compositions were prepared as in Example 1 except that 4 parts or 8 parts of dimethylpolysiloxane-α,ω-diol having an average degree of polymerization of 10 was used instead of 3 parts of the siloxane of formula (5), and 2 parts of 29% aqueous ammonia was omitted. In preparing the composition of Comparative Example 2 using 4 parts of dimethylpolysiloxane-α,ω-diol, it was difficult to blend precipitated silica in the liquid silicone rubber base. The composition of Comparative Example 3 using 8 parts of dimethylpolysiloxane-α,ω-diol was thixotropic and unsuitable to injection mold.

Comparative Example 4

A liquid silicone rubber composition was prepared as in Example 1 except that 2 parts of 29% aqueous ammonia was omitted.

The silicone rubber compositions of Examples 1, 2 and Comparative Examples 1, 3, 4 were examined for cure at 150° C. by means of a rheometer. T10 and T90 are times passed when the torque reached 10% and 90% of the torque developed at the lapse of 2 minutes from the start of curing. Also each composition was examined for flow and rated "O" when it flowed without force, "Δ" when it was thixotropic, but flowed if forced, and "X" when it did not flow.

Each silicone rubber composition was press molded at 120° C. for 10 minutes into a rubber sheet of 2 mm thick which was measured for physical properties including hardness, tensile strength (TS), and elongation.

Each silicone rubber base was kept at 60° C. while a change of viscosity was observed.

The results are shown in Table 1.

TABLE 1

|  | E1 | E2 | CE1 | CE3 | CE4 |
|---|---|---|---|---|---|
| Cure |  |  |  |  |  |
| T10 (sec.) | 23 | 24 | 24 | 26 | 25 |
| T90 (sec.) | 33 | 35 | 42 | 37 | 36 |
| Flow | O | O | O | X | Δ |
| Hardness | 49 | 47 | 48 | 53 | 50 |
| TS (kgf/cm²) | 72 | 68 | 78 | 61 | 74 |
| Elongation (%) | 330 | 320 | 380 | 280 | 320 |
| Viscosity (poise) |  |  |  |  |  |
| Initial | 2100 | 2200 | 1900 | 6800 | 3000 |
| After 10 days | 2600 | 2900 | 3900 | 18000 | 6500 |

It is evident from Table 1 that the silicone rubber compositions within the scope of the invention have a low initial viscosity, flow smoothly, cure quickly, and experience a little change of viscosity during shelf storage. In contrast, the composition using hexamethyldisilazane as the wetter and water instead of the condensation catalyst (Comparative Example 1) is less curable and experiences a fair change of viscosity during shelf storage. The composition using α,ω-siloxane diol as the wetter and free of the condensation catalyst (Comparative Example 3) has a high initial viscosity, is little flowing and experiences a substantial change of viscosity during shelf storage. The composition free of the condensation catalyst (Comparative Example 4) is less flowing and insufficiently improved in viscosity stability during shelf storage.

Example 3

A liquid silicone rubber composition was prepared as in Example 1 except that fumed silica having a BET specific surface area of 200 m²/g (Aerosil 200, manufactured by Nihon Aerosil K.K.) was used instead of the precipitated silica (Nipsil LP), and 6 parts of the siloxane of formula (5) was used.

Example 4

A liquid silicone rubber composition was prepared as in Example 1 except that fumed silica (Aerosil 200) was used instead of the precipitated silica (Nipsil LP), and 6 parts of the siloxane of formula (7) was used instead of 3 parts of the siloxane of formula (5).

Comparative Example 5

A liquid silicone rubber composition was prepared as in Comparative Example 1 except that fumed silica (Aerosil 200) was used instead of the precipitated silica (Nipsil LP), and 8 parts of hexamethyldisilazane and 2 parts of water were used.

Comparative Example 6

A liquid silicone rubber composition was prepared as in Example 3 except that 2 parts of 29% aqueous ammonia was omitted.

Each of the silicone rubber compositions of Examples 3, 4 and Comparative Examples 5, 6 was examined for cure and flow. Each silicone rubber composition was press molded into a rubber sheet which was measured for physical properties. Each silicone rubber base was measured for viscosity before and after shelf storage at 60° C. The results are shown in Table 2.

TABLE 2

|  | E3 | E4 | CE5 | CE6 |
|---|---|---|---|---|
| Cure |  |  |  |  |
| T10 (sec.) | 23 | 24 | 26 | 25 |
| T90 (sec.) | 37 | 36 | 44 | 35 |
| Flow | O | O | O | Δ |
| Outer appearance | clear | clear | clear | clear |
| Hardness | 45 | 44 | 48 | 46 |
| TS (kgf/cm²) | 84 | 86 | 92 | 80 |
| Elongation (%) | 600 | 610 | 580 | 560 |
| Viscosity (poise) |  |  |  |  |
| Initial | 4500 | 4200 | 5000 | 7000 |
| After 10 days | 6500 | 6000 | 23000 | 12000 |

It is evident from Table 2 that the silicone rubber compositions within the scope of the invention have a low initial viscosity, flow smoothly, cure quickly, and experience a little change of viscosity during shelf storage. In contrast, the composition using hexamethyldisilazane as the wetter and water instead of the condensation catalyst (Comparative Example 5) is less curable and experiences a substantial change of viscosity during shelf storage. The composition free of the condensation catalyst (Comparative Example 6) is less flowing and insufficiently improved in viscosity stability during shelf storage.

Japanese Patent Application No. 314174/1995 is incorporated herein by reference.

While this invention has been described with respect to a preferred embodiment, it will be understood by those skilled in the art that various changes and modifications may be made without departing from the spirit and scope of the invention.

We claim:

1. A liquid silicone rubber composition comprising
   (A) an organopolysiloxane having at least two alkenyl groups each attached to a silicon atom in a molecule,
   (B) a reinforcing silica filler having a specific surface area of at least 50 m²/g as measured by BET,
   (C) a condensation catalyst,
   (D) a compound of the following general formula (1) or (2):

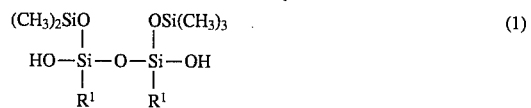

wherein R¹ is selected from the group consisting of a methyl, trimethylsiloxy, vinyl and trifluoropropyl radical,
   (E) an organohydrogenpolysiloxane having at least two hydrogen atoms each attached to a silicon atom in a molecule, and
   (F) a platinum catalyst.

2. A method for preparing a liquid silicone rubber composition comprising
   (A) an organopolysiloxane having at least two alkenyl groups each attached to a silicon atom in a molecule,
   (B) a reinforcing silica filler having a specific surface area of at least 50 m²/g as measured by BET,
   (C) a condensation catalyst,
   (D) a compound of the following general formula (1) or (2):

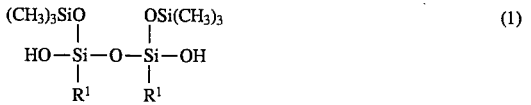

wherein R¹ is selected from the group consisting of a methyl, trimethylsiloxy, vinyl and trifluoropropyl radical,
   (E) an organohydrogenpolysiloxane having at least two hydrogen atoms each attached to a silicon atom in a molecule, and
   (F) a platinum catalyst,
   said method comprising the steps of mixing whole or a part of component (A) and whole of component (B) and, at the same time, blending components (C) and (D) therewith and, subsequently, mixing any remainder of component (A) and components (E) and (F) therewith.

3. The composition of claim 1, wherein the organopolysiloxane, (A), is of the average compositional formula (3):

wherein R is a monovalent hydrocarbon group of 1–12 carbon atoms optionally substituted with halogen or cyano groups with 0.001 to 5 mol % of the R groups being alkenyl groups and a is a positive number of 1.65 to 2.35.

4. The method of claim 2, wherein the organopolysiloxane, (A), is of the average compositional formula (3):

$$R_aSiO_{(4-a)/2} \qquad (3)$$

wherein R is a monovalent hydrocarbon group of 1–12 carbon atoms optionally substituted with halogen or cyano groups with 0.001 to 5 mol % of the R groups being alkenyl groups and a is a positive number of 1.65 to 2.35.

5. The composition of claim 1, wherein the organopolysiloxane, (A), is blocked at the ends of its molecular chain with triorganosilyl groups.

6. The method of claim 2, wherein the organopolysiloxane, (A), is blocked at the ends of its molecular chain with triorganosilyl groups.

7. The composition of claim 1, wherein the condensation catalyst, (C), is ammonia, aqueous ammonia, an ammonium salt, a phosphorus-siliconate of the formula:

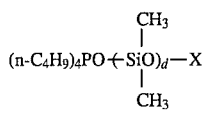

wherein X is a hydrogen atom or $(C_4H_9)_4P$— group and d is an integer of 3 to 100, a potassium-siliconate salt of the formula:

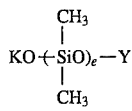

wherein Y is K or hydrogen atom and e is an integer of 3 to 100, a tin compound, titanium compound or zinc compound.

8. The method of claim 2, wherein the condensation catalyst, (C), is ammonia, aqueous ammonia, an ammonium salt, a phosphorus-siliconate of the formula:

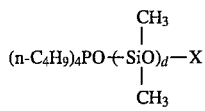

wherein X is a hydrogen atom or $(C_4H_9)_4P$— group and d is an integer of 3 to 100, a potassium-siliconate salt of the formula:

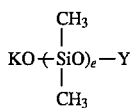

wherein Y is K or hydrogen atom and e is an integer of 3 to 100, a tin compound, titanium compound or zinc compound.

9. The composition of claim 1, wherein the organohydrogenpolysiloxane, (E), is of the average compositional formula (4):

$$R'_bH_cSiO_{(4-b-c)/2} \qquad (4)$$

wherein R' is a monovalent hydrocarbon group of 1–12 carbon atoms optionally substituted with halogen or cyano groups and b and c satisfy the equations $0.8 \leq b \leq 2.2$, $0.002 \leq c \leq 1.0$ and $0.8 \leq b+c \leq 3$.

10. The method of claim 2, wherein the organohydrogenpolysiloxane, (E), is of the average compositional formula (4):

$$R'_bH_cSiO_{(4-b-c)/2} \qquad (4)$$

wherein R' is a monovalent hydrocarbon group of 1–12 carbon atoms optionally substituted with halogen or cyano groups and b and c satisfy the equations $0.8 \leq b \leq 2.2$, $0.002 \leq c \leq 1.0$ and $0.8 \leq b+c \leq 3$.

11. The composition of claim 1, wherein the silica filler, (B), is present in an amount of 5–100 parts by weight per 100 parts by weight of the organopolysiloxane, (A), the condensation catalyst, (C), is present in an amount of 0.005 to 1 part by weight per 1 part by weight of the compound of component (D), the compound of component (D) is present in an amount of 1–30% by weight based on the weight of the silica filler, (B), and the organohydrogenpolysiloxane, (E), is present in an amount sufficient to provide a ratio of the number of SiH groups in component (E) to silicon-attached alkenyl groups in the organopolysiloxane, (A), of 0.5:1 to 20:1.

12. The method of claim 2, wherein the silica filler, (B), is used in an amount of 5–100 parts by weight per 100 parts by weight of the organopolysiloxane, (A), the condensation catalyst, (C), is used in an amount of 0.005 to 1 part by weight per 1 part by weight of the compound of component (D), the compound of component (D) is used in an amount of 1–30% by weight based on the weight of the silica filler, (B), and the organohydrogenpolysiloxane, (E), is used in an amount sufficient to provide a ratio of the number of SiH groups in component (E) to silicon-attached alkenyl groups in the organopolysiloxane, (A), of 0.5:1 to 20:1.

* * * * *